(12) United States Patent
Zehavi et al.

(10) Patent No.: US 8,843,601 B1
(45) Date of Patent: Sep. 23, 2014

(54) SYSTEMS AND METHODS FOR VOIP COMMUNICATION COMPLETION TO A MOBILE DEVICE

(71) Applicant: Vonage Network, LLC, Holmdel, NJ (US)

(72) Inventors: Boaz Zehavi, Jersey City, NJ (US); Dany Orr, Tel Aviv (IL); Guy Baron, Tel Aviv (IL); Gil Osher, Tel Aviv (IL)

(73) Assignee: Vonage Network, LLC, Holmdel, NJ (US)

( * ) Notice: Subject to any disclaimer, the term of this patent is extended or adjusted under 35 U.S.C. 154(b) by 0 days.

(21) Appl. No.: 13/940,674

(22) Filed: Jul. 12, 2013

(51) Int. Cl.
*G06F 15/177* (2006.01)
*H04L 29/06* (2006.01)

(52) U.S. Cl.
CPC .................. *H04L 29/06197* (2013.01)
USPC .......................................... 709/220; 709/203

(58) Field of Classification Search
USPC .................................................. 709/203, 220
See application file for complete search history.

(56) References Cited

U.S. PATENT DOCUMENTS

| 7,571,207 | B2 * | 8/2009 | Yoshizawa et al. ........... 709/203 |
| 8,090,401 | B2 * | 1/2012 | Soto ........................... 455/553.1 |
| 2011/0173681 | A1 * | 7/2011 | Qureshi et al. .................... 726/4 |
| 2012/0173610 | A1 * | 7/2012 | Bleau et al. ................... 709/203 |

* cited by examiner

*Primary Examiner* — Phuoc Nguyen
(74) *Attorney, Agent, or Firm* — Nixon & Vanderhye P.C.; Joseph Pagnotta (57) ABSTRACT

Systems and methods for establishing an IP telephone call to a called party's telephony device include attempting to send a call setup request directly to the called party's telephony device, and requesting that a push notification be sent to the called party's telephony device. If the direct request does not reach the called party's telephony device, the push notification will result in the called party's telephony device contacting the IP telephony system to setup the requested call. In some embodiments, the request for a push notification is not sent until the direct request is determined to have failed.

20 Claims, 8 Drawing Sheets

SYSTEMS AND METHODS FOR VOIP COMMUNICATION COMPLETION TO A MOBILE DEVICE

BACKGROUND OF THE INVENTION

The invention relates to voice over Internet protocol (VOIP) communications, and more specifically to systems and methods for establishing a VOIP communications session with a telephony device.

Many mobile communications and computing devices are now configured to load and run software applications that can provide virtually any sort of functionality. And because many of these mobile communications and computing devices are able to establish a link to the Internet, either via a wireless router or via a data channel of a cellular data network, it is possible for a software application running on a mobile device to communicate via the Internet. Examples of such mobile communications and computing devices include the Apple iPhone™ and various mobile telephones that utilize the Android™ operating system.

Various telephony service providers have created communications software applications that can be loaded and run on a mobile communications device such as the Apple iPhone™. Some communications software applications provide functionality that allows an Internet Protocol (IP) telephony system to setup an IP telephony communication with a mobile communications device via an Internet connection or a cellular data connection that is provided by a cellular service provider. For example, when a mobile communications device is running one of these communications software applications, it is possible for an IP telephony system to establish an IP telephone call to the mobile communications device. However, if such a communications software application is not presently running on the mobile device, it can be difficult or impossible for the IP telephony system to communicate with the mobile device to setup a new telephony communication with the mobile device.

Also, the operating systems of some mobile communications devices allow a software application to be placed in a background mode for a period of time, or indefinitely. While in the background, the software application typically utilizes few, if any, resources of the mobile communications device. This helps to minimize battery power consumption. In some instances, an external device can send a wake up message to the mobile communications device to cause a software program in the background to be re-activated, or brought to the foreground. Once brought to the foreground, the software application can begin communicating with the external device which issued the wake up command. However, the operating systems of some mobile communications devices will not allow even a wake up command to be used to re-activate a software program that is in the background.

Because of these facts, when a calling party attempts to establish an IP telephone call to a called party's mobile communications device via an IP telephony system, it is often impossible for the IP telephony system to complete the telephone call to the called party's mobile device. As noted, in some instances, the communications software application is not running on the mobile communications device. In other instances, the communications software application is in the background, and it cannot be reactivated by a wake up command from an external device. In these instances, the IP telephony system cannot communicate with the communications software application, and therefore cannot establish a new IP telephone call to the called party's mobile device.

Moreover, when an IP telephony system is attempting to setup a new incoming call via a communications software application on a user's mobile device, the IP telephony system may not know if the communications software application is running on the called party's mobile device, or whether the software application is in the background on the mobile device. For these reasons, the IP telephony software application may not know the easiest or fastest way to setup a new incoming call to the mobile device.

DETAILED DESCRIPTION OF THE INVENTION

Systems and methods for setting up an IP telephony communication with a mobile telephony device are described below. These systems and methods make it possible to establish an IP telephony communication with a communications software application on a mobile telephony device even when the mobile telephony device is not already running the communications software application, and even when the communications software application is running, but presently in the background of an operating system.

Figure 1:
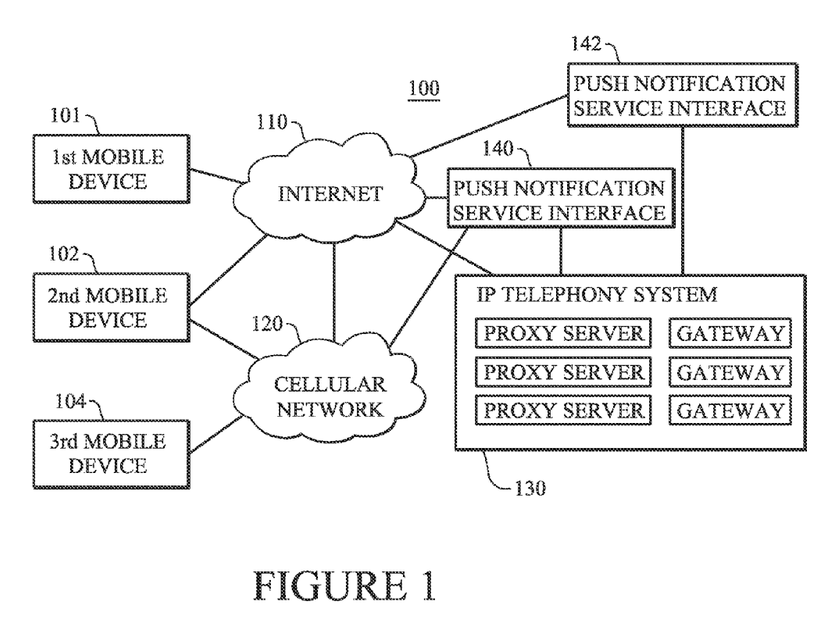
FIG. 1 is a diagram illustrating various elements of a communications environment that can setup telephony communications to a mobile telephony device.

FIG. 1 illustrates a communications environment 100 which can be used to setup IP telephony communications to a user's mobile telephony device, and more specifically, to a communications software application that is running on the user's mobile telephony device. As shown therein, first, second and third mobile telephony devices 101, 102, 104 communicate via a data network such as the Internet 110, and/or via a data channel provided by a cellular network 120. The mobile telephony devices can be any type of mobile communications and computing devices that are capable of loading and running a communications software application that can setup an IP telephony communication with elements of an IP telephony system 130.

The first mobile telephony device 101 has a data connection to the Internet 110. This data connection could be a wired or wireless connection to the Internet 110. For example, the first mobile telephony device 101 could establish a wireless connection to the Internet 110 via a wireless router. The second mobile telephony device 102 has a connection to the Internet 110, and a connection to a cellular network 120 via a cellular link. The connection to the Internet 110 could be via wired or wireless means. The connection to the cellular network 120 would typically be established via a cellular transceiver in the second mobile telephony device 102. The third mobile telephony device 104 has only a connection to the cellular network 120, which would typically be established via a cellular transceiver in the third mobile telephony device 104.

The cellular links established by both the second mobile telephony device 102 and the third mobile telephony device 104 could be used to access a data channel provided by the cellular network 120. Thus, the data channel provided by the cellular network 120 allows the second mobile telephony device 102 and the third mobile telephony device 104 to access the Internet 110.

The communications environment also includes two push notification service interfaces 140 and 142. The push notification service interfaces 140, 142 could be two separate instantiations of a single Push Notification Service that are maintained on separate hardware located in different locations. Alternatively, the two push notification service interfaces 140, 142 could be provided by two completely separate push notification services.

The push notification service interfaces 140, 142 are coupled to the Internet 110, which allows the push notification service interfaces 140, 142 to send push notifications to the mobile telephony devices 101, 102, 104. The push notifications could be sent to the first and second mobile devices 101, 102 via the Internet 100. The push notifications could also be sent to the second and third mobile devices 102, 104 via a path that includes the Internet 110 and the cellular data network 120. In alternate embodiments, the push notification service interfaces 140, 142 may communicate directly with the cellular network 120 in order to cause push notifications to be delivered to mobile telephony devices.

The communications environment 100 also includes an IP telephony system 130. The IP telephony system 130 maintains and controls multiple proxy servers and multiple gateways, as is well known to those of ordinary skill in the IP telephony art.

Figure 2:
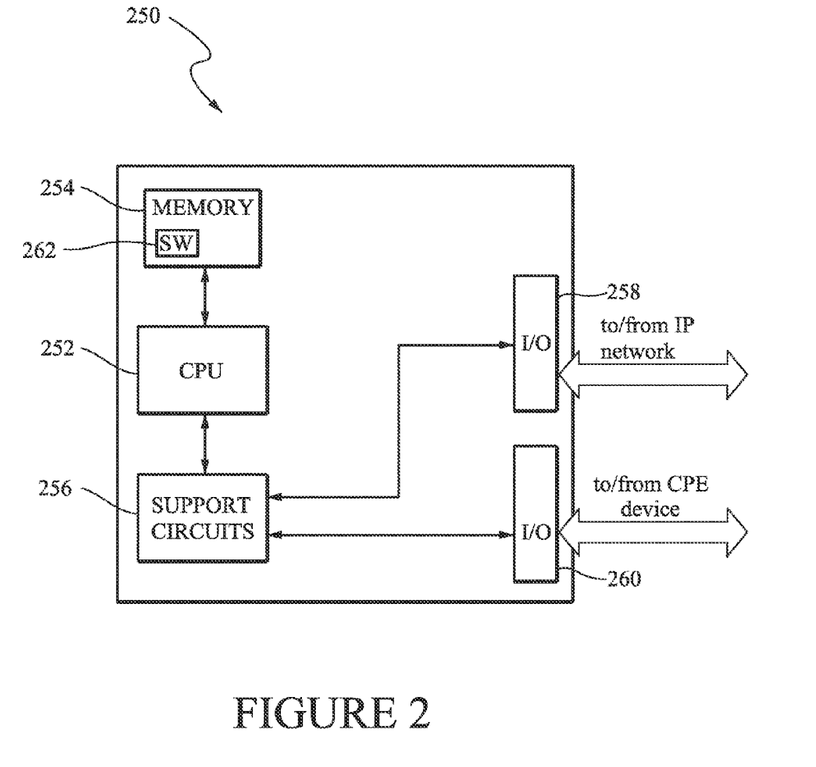
FIG. 2 is a diagram of various elements of a processor which can form part of an element of an IP telephony system, or part of a telephony device.

FIG. 2 illustrates elements of a computer processor 250 that can be used as part of an element of the IP telephony system 130 or a telephony device to accomplish various functions. The IP telephony system 130 could include multiple processors 250 located at various locations in the system, along with their operating components and programming, each carrying out a specific or dedicated portion of the functions performed by the IP telephony system 130.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 130. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

Figure 3:
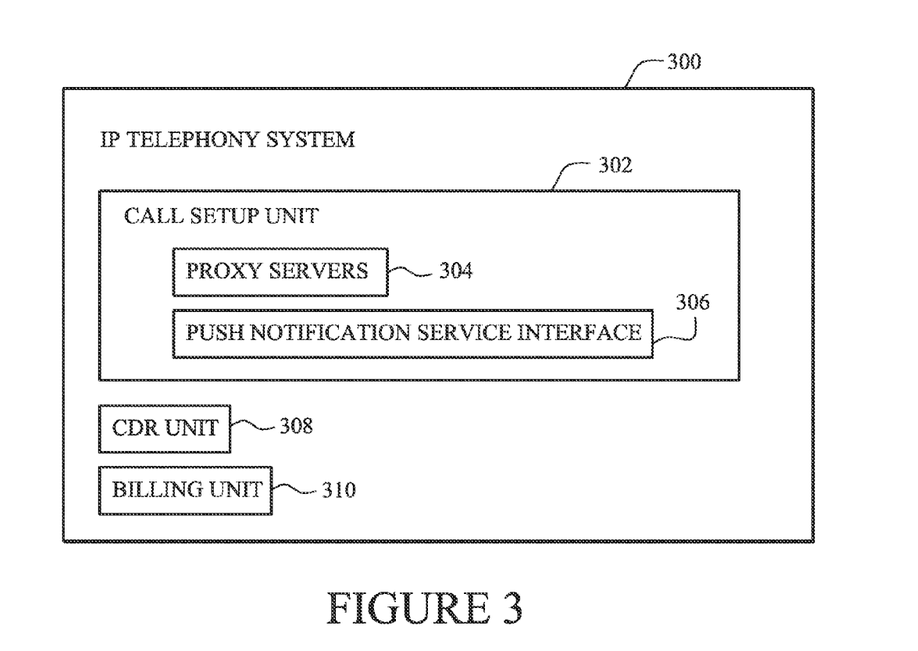
FIG. 3 is a diagram of various elements of an IP telephony system embodying the invention.

FIG. 3 illustrates selected elements of an IP telephony system 300 embodying aspects of the invention. The IP telephony system 300 includes a call setup unit 302 that is responsible for setting up telephony communications with user telephony devices. The call setup unit 302 includes multiple proxy servers 304 that may be positioned in various different geographical locations. The proxy servers 304 communicate with user telephony devices to setup and sometimes conduct telephony communications. The call setup unit 302 also includes a push notification service interface 306. As will be explained below, the push notification service interface 306 requests that a third party push notification service send push notifications to user telephony devices in order to assist in setting up telephony communications to the user telephony devices.

The IP telephony system 300 also includes a call detail record (CDR) unit that stores CDRs with information about individual telephony communications that are facilitated, setup or carried over the IP telephony system 300. A billing unit 310 uses information in the CDR unit to bill for the communications handled by the IP telephony system 300.

Figure 4:
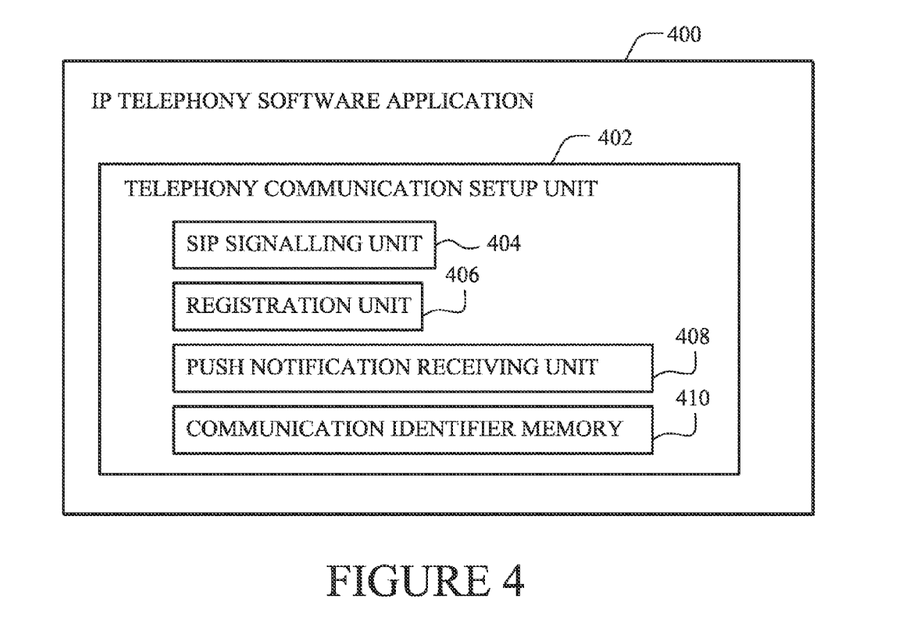
FIG. 4 is a diagram of various elements of an IP telephony software application which can be loaded and run on a mobile telephony device.

FIG. 4 depicts elements of an IP telephony software application 400 that can be loaded and run by a user telephony device, such as a smart phone. An IP telephony software application 400 can also be loaded and run on other mobile computing devices that are not normally considered telephony devices to allow such mobile computing devices to conduct IP telephony communications.

The IP telephony software application 400 includes a telephony communication setup unit 402. The telephony communication setup unit 402 includes a SIP signaling unit 404 that communicates with elements of an IP telephony system using the Session Initiation Protocol (SIP) to setup and conduct IP telephony communications. SIP is a signaling protocol for initiating, managing and terminating media (e.g., voice, data and video) sessions across packet based networks that typically use the Internet Protocol (IP), of which VOIP is an example. The details and functionality of SIP can be found in the Internet Engineering Task Force (IETF) Request for Comments (RFC) Paper No. 3261 entitled, "SIP: Session Initiation Protocol" herein incorporated in its entirety by reference. SIP establishes and negotiates a session, including the modification or termination of a session. It uses a location-independent address system feature in which called parties can be reached based on a party's name. SIP supports name mapping and redirection, allowing users to initiate and receive communications from any location. As such, it presents part of a solution to the problem of establishing a communications channel with a mobile telephony device, as described below.

A registration unit 406 registers with an IP telephony system 300 when the IP telephony software application 400 is able to communicate with the IP telephony system. A push notification receiving unit 408 is responsible for receiving and responding to push notifications sent from a third party push notification service, as will be explained in more detail below.

A communication identifier memory 410 stores communication identifiers that are included in call setup signaling received from an IP telephony system. Such communication identifiers may be included in SIP signaling that is used to setup a new IP telephony communication. The communication identifiers may also be included in push notifications that are received by the push notification receiving unit 408, as explained in more detail below.

As explained above, when an IP telephony system wishes to setup a new IP telephony communication with a communications software application on a user's telephony device, it is necessary for one or more elements of the IP telephony system to communicate with the telephony communication setup unit 402 of an IP telephony software application 400 on the user's telephony device. In some instances, this may be easily accomplished. In other instances, this may be difficult to accomplish.

The simplest situation is where a user's telephony device is running an IP telephony software application 400, and where the software application 400 has registered with an IP telephony system, and is in periodic communication with the IP telephony system. Under these circumstances, when the IP telephony system wishes to setup a new telephony communication with the user's telephony device, a proxy server of the IP telephony system can send a SIP INVITE message to the software application on the user's telephony device. The software application will respond to the proxy server, and the software application and the proxy server then communicate back and forth to setup the new telephony communication.

There are various circumstances where a server of an IP telephony system is unable to reach a communications software application on a user's telephony device for purposes of setting up a new incoming telephony communication to the user's telephony device. Several such scenarios are discussed below. However, these scenarios should in no way be considered limiting. Other situations may arise where a server of an IP telephony system is unable to reach a communications software application on a user's telephony device In many instances, a user's telephony device obtains access to a data network, such as the Internet, via a wireless interface device, such as a wireless router that provides WiFi or WiMax service. As is well known to those of ordinary skill in the art, such wireless interface devices often operate a pinhole timer mechanism as a security measure to prevent undesired or unauthorized communications from being delivered to the user's telephony device. In the context of IP telephony communications, each time that a communication is sent from a communications software application on the user's telephony device to a server of the IP telephony system, the wireless interface device re-sets a timer of the pinhole timer mechanism. If no communication is sent from the communications software application to a server of the IP telephony system for more than a predetermined period of time, the pinhole closes, and the wireless interface device prevents further communications from the server of the IP telephony system from reaching the communications software application on the user's telephony device. Thus, if the pinhole closes, even though the communications software application on the user's telephony device may still be running in the foreground of the operating system, setup messages from a server of the IP telephony system cannot reach the communications software application.

Another scenario where a server of an IP telephony system may be unable to communicate with a communications software application on a user's telephony device occurs when the communications software application has been moved to the background of the operating system on the user's telephony device. While in the background, the communications software application is unable to send regular keep alive messages to a server of an IP telephony system. If the user's telephony device is communicating through a wireless interface device that operates a pinhole timer mechanism, the lack of regular keep alive messages will ultimately result in the pinhole of a wireless interface device closing, as described above.

If the user's communications device does not communicate via a wireless interface that operates a pinhole timer mechanism, or in situations where a pinhole of a pinhole timer mechanism has not closed, the operating system of the user's telephony device may respond to a wake up message sent from a server of an IP telephony system. Such a wake up message could be used to cause the communications software application to be brought to the foreground, at which point the communications software application can receive and respond to messages from the IP telephony system for purposes of setting up a new incoming IP telephony communication.

However, some operating systems cannot or will not respond to wake up messages from a server of an IP telephony system. In those circumstances, whenever the communications software application is in the background, it is unable to receive communications from the servers of an IP telephony system for purposes of setting up a new incoming IP telephony communication to the user's telephony device.

Another situation where a server of an IP telephony system is unable to setup a new incoming IP telephony communication to a communications software application on a user's telephony device is where the communications software application is not even running on the user's telephony device. Under these circumstances, it is necessary to cause the communications software application to begin running before a new incoming IP telephony communication can be established through the communications software application.

When an IP telephony system receives an incoming call that must be connected to a user's telephony device, the IP telephony system will not necessarily know what the situation is on the user's telephony device. In other words, the IP telephony system may not know if the pinhole of a pinhole timer mechanism of a wireless interface device has closed. The IP telephony system also may not know if a communications software application on a user's telephony device is running. And even if the communications software application is running, the IP telephony system may not know of the communications software application has been moved to the background of an operating system. For all these reasons, the IP telephony system many not know the best way to contact the communications software application on the user's telephony device in order to setup the new incoming IP telephony communication.

The systems and methods described below are used to setup a new incoming IP telephony communication to a communications software application on a user's telephony device. These methods are intended to deal with the uncertainties discussed above. Also, the specific method which is used to establish contact with a communications software application on a user's telephony device may vary depending on the configuration of the user's telephony device, such as the operating system used by the user's telephony device.

If a server of an IP telephony system cannot directly communicate with a communications software application on a user's telephony device, a push notification may be used to establish contact with the communications software application. Push notifications, and methods of using push notifications, are first discussed below.

A push notification is delivered to a user's telephony device via a push notification service. Typically, a push notification service is a third party service that is not directly connected with a telephony service provider. For example, Apple provides the Apple Push Notification Service (APNS), which is presently designed to send messages to at least the Apple iPhone™, the Apple iPad™ and the Apple iTouch™ devices. The push notifications are rigidly formatted messages that can be received by such devices anytime they are running and connected to either the Internet or a cellular data network.

Although the following description uses the APNS as an example, use of the APNS is not required, nor should this example be considered limiting. Other push notification services that have different message formats and different capabilities could also be used.

Also, in the examples that follow, the signaling between various elements used to establish an IP telephony communication with a mobile device generally follow the SIP format. Systems and methods of establishing an IP telephony communication with a mobile device could also use signaling formats other than SIP. Thus, the description of typical SIP signaling should not be considered limiting.

The Apple Push Notification Service allows an application that is installed on an Apple device such as the Apple iPhone™ to complete a registration process that results in the application receiving a device token. The device token uniquely identifies the mobile device itself. The application on the mobile device then provides this token to the service provider that created the application on the mobile device.

Once the service provider has possession of the token associated with a mobile device, the service provider can cause the APNS to send push notifications to the mobile device. A request for a push notification that is sent from the service provider to the APNS would include the device token, and information about the type of push notification that is to be sent to the mobile device.

When the APNS receives a push notification request from a service provider, it uses the information in the request to create a formatted push notification that it then delivers to the mobile device. The push notification can cause the mobile device to take several different actions. For example, a push notification can cause the mobile device to update a number displayed on a badge associated with the service provider's application. The number usually indicates that new information is available to the application, and the number may indicate the quantity of the new information. When a user sees a number on an application badge, the user can press the badge to load and run the application, which usually results in the application requesting and obtaining the new information that is waiting.

A push notification can also cause a notification message to be displayed on the mobile device. The notification message will usually include two buttons that the user can press. One button, usually labeled as "DISMISS," allows the user to dismiss the notification message. If the user presses this button, the notification message will no longer be displayed, and no further action will be taken by the mobile device.

However, if the user pushes the other button, which is usually labeled as "VIEW," the mobile device will load and run the application on the mobile device that is associated with the service provider that caused the push notification to be sent.

In other configurations, when a push notification is received by a mobile device, the mobile device simply automatically loads and runs a particular application associated with the push notification, without waiting for user intervention.

As explained above, a push notification message is typically associated with a particular application that is resident on a mobile device. In some instances, the application may already be running on the mobile device when a push notification message associated with the application is received. In this situation, the push notification message is passed along to the application, either automatically, or only after the user grants permission for the message to be passed along.

When a service provider requests that a notification message be sent to a mobile device, the service provider can specify the text that is presented to the user as part of the notification message displayed on the mobile device. The wording to be displayed is part of the push notification request that is sent from the service provider to the APNS. And the APNS uses this information to format the push notification that is then delivered to the mobile device.

As explained above, an IP telephony system can provide a communications software application that is loaded onto a user's mobile telephony device. The communications software application can complete a registration process that results in a device token being issued to the communications software application. And the communications software application then sends a copy of the device token to the IP telephony system. The IP telephony system uses this device token in communications with the push notification service interfaces 140, 142 to request that push notifications be sent to the user's mobile telephony device.

A method of using a push notification to help establish an IP telephony communication with a communications software application on a mobile telephony device will now be described in conjunction with the diagram in FIG. 5 and the flowchart in FIG. 6. This method could be used when a server of an IP telephony system is unable to directly contact the communications software application. This method assumes that the communications software application on the mobile telephony device has already obtained a device token and forwarded that device token to the IP telephony system.

The method 600 begins and proceeds to step S602, where a calling party 500 seeks to establish an IP telephone call to the called party's mobile telephony device 540. This could occur when the calling party 500 dials the called party's telephone number. However, this could also occur under a variety of other circumstances. For example, the calling party 500 might be using a communications application on his own mobile telephony device, and the calling party 500 might utilize the communications application to request that an IP telephone call be placed to the called party's mobile telephony device 540. For purposes of the following explanation, the way in which the call is initiated is not important. All that matters is that the calling party 500 is seeking to establish a telephone call to the called party's mobile telephony device 540 via an IP telephony system.

The IP telephony system, such as the IP telephony system 300 in FIG. 3, would, in some fashion, control and/or interact with multiple proxy servers 510, 530, 532 and 534. A first proxy server 510 is referred to as the inbound proxy server 510 because the request to establish an IP telephone call to the called party's mobile telephony device 540 is first received at this proxy server. The other proxy servers 530, 532, 534 illustrated in FIG. 5 are referred to as outbound proxy servers because these proxy servers are the ones capable of making contact with and registering the called party's mobile telephony device 540.

Figure 5:
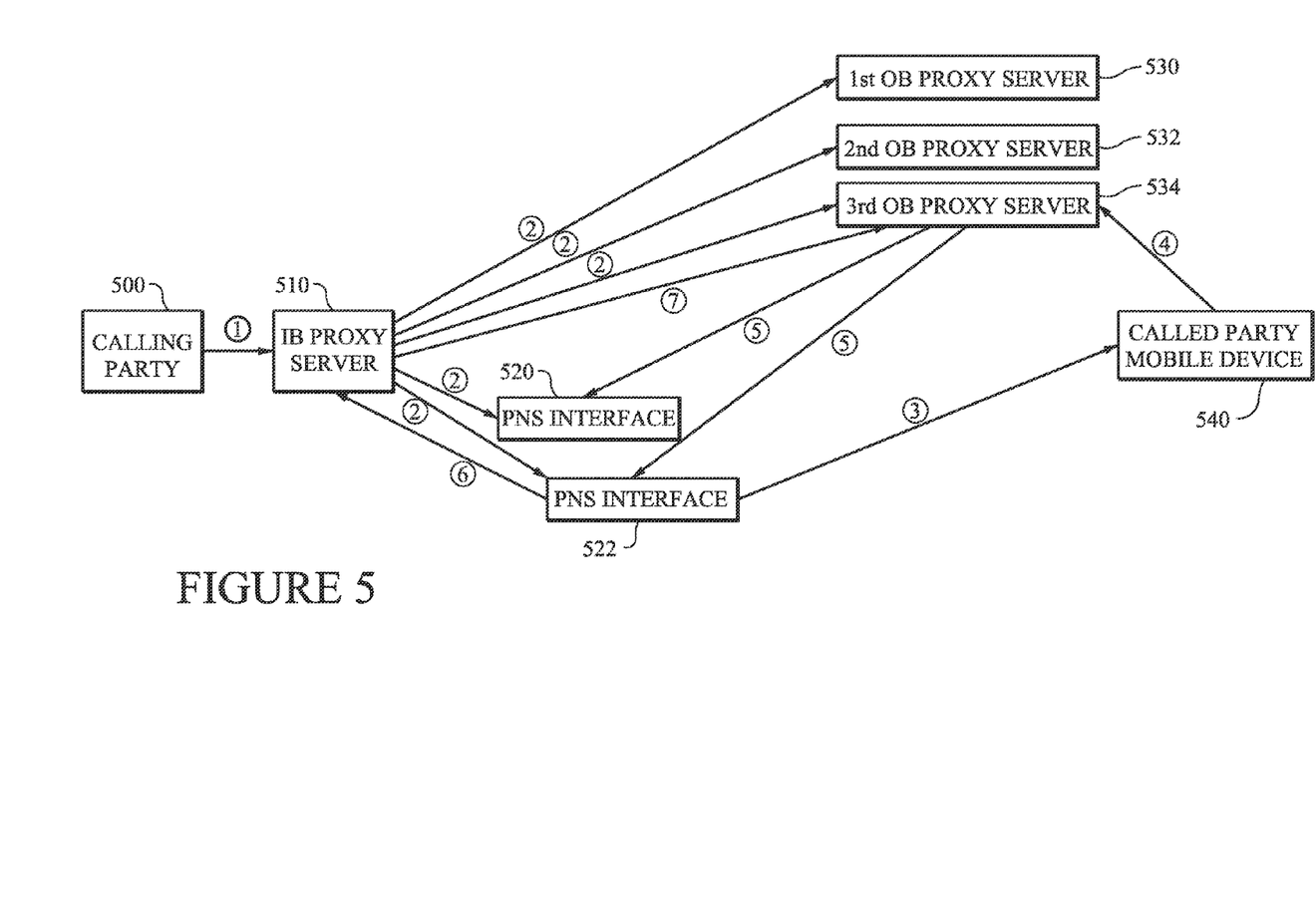
FIG. 5 is a diagram illustrating one way in which message signaling to setup a new telephony communication to a mobile telephony device passes between the mobile telephony device, elements of an IP telephony system and one or more third party push notification services.

FIG. 5 also illustrates multiple push notification service interfaces 520, 522. As explained above, these push notification service interfaces 520, 522 are capable of sending push notifications to the called party's mobile telephony device 540 in response to requests from service providers. Each push notification service interface could be a separate instantiation of a single push notification service running on a separate set of hardware, where different instantiations are at different physical locations. In many instances, the push notification service interfaces 510, 522 are operated by an entity other than the IP telephony system.

As noted above, the method 600 begins when the calling party 500 sends a request to establish an IP telephone call to the called party's mobile telephony device 540. In step S602, the request is received by the inbound proxy server 510. This request corresponds to the arrow in FIG. 5 labeled with reference number 1.

In step S604, the inbound proxy server 510 sends an INVITE message to all outbound proxy servers 530, 532, 534 associated with the called party's mobile telephony device 540, as indicated by the arrows in FIG. 5 labeled with reference number 2. Each of the outbound proxy servers 530, 532, 534 would then try to contact the communications software application on the called party's mobile telephony device 540. However, for one of the reasons explained above, the outbound proxy servers 530, 532, 534 are unable to directly communicate with the communications software application on the called party's mobile telephony device 540. As a result, each of the outbound proxy servers 530, 532, 534 sends a message back to the inbound proxy server 510 indicating that the called party cannot be found.

In some embodiments, at the same time the inbound proxy server 510 sends INVITE messages to the outbound proxy servers 530, 532, 534, the inbound proxy server 510 also sends a request to the push notification service interfaces 520, 522 associated with the called party's mobile telephony device 540 to request that a push notification be sent to the called party's mobile telephony device 540. In alternate embodiments, the request for a push notification may not be sent to the push notification service interfaces 520, 522 until the outbound proxy servers 530, 532, 534 report that they are unable to contact the communications software application on the called party's mobile telephony device 540.

In FIG. 5, the architecture includes a first push notification service interface 520 and a second push notification service interface 522. The request for a push notification sent from the inbound proxy server 510 may include information identifying the calling party by name, telephone number, or via other identifying means. In some instances, the request that a push notification be sent may take the same form as a SIP INVITE message sent to the outbound proxy servers. The requests sent to the push notification service interfaces 520, 522 are also indicated by arrows labeled with reference number 2.

In some embodiments, there may be a limit on the number and identity of the push notification service interfaces that are associated with a particular mobile telephony device. In other embodiments, any number of push notification service interfaces may be associated with a mobile telephony device.

In FIG. 5, the second push notification service interface 522 is linked to the called party's mobile device 540. When the second push notification service interface 522 receives the request to send a push notification, it generates and forwards a suitable push notification to the called party's mobile telephony device 540. This signaling is represented with the arrow identified with reference number 3.

When the called party's mobile telephony device 540 receives the push notification, it displays a message to the called party that indicates there is an incoming telephone call. The message may include DISMISS and VIEW buttons that can be activated by the called party. The notification message that is displayed to the called party by the called party's mobile telephony device 540 can take many different forms. In some instances, it may merely indicate that there is an incoming telephone call. The called party would then hit the view key to receive the incoming telephone call.

In other instances, the notification message may provide an indication regarding the identity of the calling party. This information would be provided by the inbound proxy server 510 as part of the request for a push notification. The push notification service interface 522 would use the information provided by the inbound proxy server 510 to format a push notification that will cause the relevant information to appear on the called party's mobile telephony device 540.

If the called party does not wish to answer the call, the called party can hit the DISMISS key, and the message will no longer be displayed and no further action will be taken by the called party's mobile telephony device 540. As a result, the calling party will ultimately be unsuccessful in establishing an IP telephone call with the called party.

On the other hand, if the called party selects the "VIEW" key, the called party's mobile telephony device 540 will activate the communications software application associated with the IP telephony system that requested that the push notification be sent. In alternate embodiments, when a push notification is received by a called party's mobile telephony device 540, the called party's mobile telephony device 540 may automatically activate the communications software application without waiting for user input.

Activating the communications software application could take many forms. If the communications software application is not running on the called party's mobile telephony device 540, the communications software application could be loaded and run. When the communications software application begins running, it would register with the IP telephony system. At which point, the IP telephony system could communicate with the communications software application for purposes of setting up the new IP telephone call from the calling party 500.

In some instances the communications software application may be running, but the application is in the background of the operating system on the called party's mobile telephony device 540. Under these circumstances, accepting the push notification could cause the communications software application to be brought to the foreground, at which point the communications software application could contact the IP telephony system to being setting up the new IP telephone call with the calling party 500.

In other instances, the communications software application might already be running in the foreground, but a pinhole of a pinhole timer mechanism may have closed, preventing the outbound proxy servers 530, 532, 534 from sending messages to the communications software application. In this scenario, accepting the push notification may simply cause the communications software application to send a new communication to an outbound proxy server, which will re-open the pinhole, and allow a proxy server to begin communicating with the communications software application for purposes of setting up the new IP telephony communication.

Figure 6:
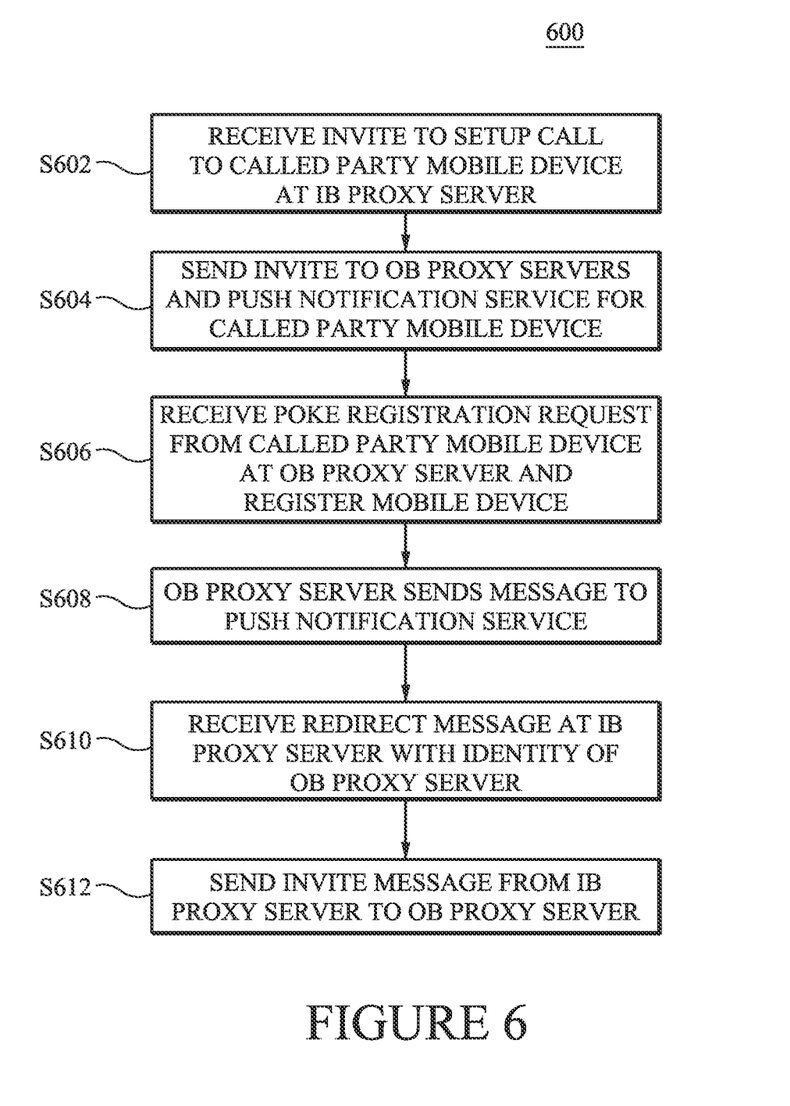
FIG. 6 is a flow chart illustrating steps of a method of setting up a new telephony communication to a mobile telephony device.

In the method illustrated in FIGS. 5 and 6, the communications software application on the called party's mobile telephony device 540 may not be active or otherwise in communication with a proxy server of the IP telephony system. In those circumstances, when the push notification is accepted by the called party, the communications software application is loaded and run. When the communications software application begins running, the communications software application may receive some information that was contained within the push notification. For example, the information may include the fact that the communications application has been activated in response to a push notification. The information may also include the identity of the push notification service interface that sent the push notification. Further, information about the incoming call, such as the telephone number or identity of the calling party, may be provided to the communications software application.

In step S606, the communications software application contacts one of the outbound proxy servers to register with the IP telephony system. FIG. 5 shows the called party's mobile telephony device 540 contacting the third outbound proxy server 534. This signaling is represented by the arrow identified with reference number 4.

In some embodiments, the registration request sent from the called party's mobile telephony device 540 to the third outbound proxy server 534 may be a typical SIP REGISTER message, followed by a special SIP NOTIFY message. When the third outbound proxy server 534 receives these messages from the called party's mobile telephony device 540, in step S608 the third outbound proxy server 534 sends a message to one or all of the push notification service interfaces 520, 522 associated with the called party's mobile telephony device 540. It is the NOTIFY message that causes this to occur. In alternate embodiments, some other type of signaling or a special type of registration request may trigger the outbound proxy server 534 to send such a message to one or more of the push notification service interfaces 220, 222. This messaging is represented by the arrows identified with reference number 5 in FIG. 5.

The initial registration request sent from the communications software application to the outbound proxy server 534 may include information about which push notification service interface originally sent the push notification to the called party's mobile telephony device 540. In alternate embodiments, information exchanged between the called party's mobile telephony device 540 and the third outbound proxy server 534 after the initial registration request may include this information. When provided, it would allow the third outbound proxy server 534 to send a message directly to the push notification service interface that sent the push notification to the called party's mobile telephony device 540.

The communications software application on the called party's mobile telephony device 540 may be configured to act differently depending on how the software application is activated. If a user activates the communications software application by simply issuing a request to run the communications software application, the communications software application may send a first type of registration request to an outbound proxy server. And this first type of registration request would not trigger the proxy server to send a message to a push notification service interface.

However, the communications software application may also be configured such that when the communications software application is activated in response to a push notification message, the communications software application sends a second type of registration request to an outbound proxy server. And this second type of registration request will cause the outbound proxy server to send a message to the push notification service interface associated with the called party's mobile device, and which sent the push notification.

In still other embodiments, each time that the communications software application is activated, regardless of how the activation occurs, the registration request sent from the called party's mobile telephony device 540 will cause the receiving proxy server to send a message to a push notification service interface associated with the called party's mobile telephony device 540.

The form of the message sent from the third outbound proxy server 534 to the push notification service interfaces 520, 522 can vary. However, the message will cause the push notification service interface that originally sent the push notification to send a message back to the inbound proxy server 510 (which requested that the push notification be sent) with information identifying the outbound proxy server 534. The message sent from the push notification service interface 522 to the inbound proxy server 510 is identified with reference number 6 in FIG. 5. In FIG. 6, step S610 involves the inbound proxy server 510 receiving the message from the push notification service interface 522.

In some instances, the message sent from the push notification service interface 522 to the inbound proxy server 510 may take the form of a SIP REDIRECT message. That message would instruct the inbound proxy server 510 to contact the outbound proxy server 534 to obtain information that allows an IP telephone call to be setup to the called party's mobile telephony device 540. In other instances, the message sent from the push notification service interface 522 to the inbound proxy server 510 may take other forms. Regardless, the message will inform the inbound proxy server 510 that it can contact the third outbound proxy server 534 to proceed with establishing an IP telephone call to the called party's mobile device 540.

In step S612, the inbound proxy server 510 then contacts the outbound proxy server 534 to obtain the information needed to establish an IP telephone call to the called party's mobile telephony device 540. In some instances, this would involve the inbound proxy server 510 sending a typical SIP INVITE message to the outbound proxy server 534. This signaling is represented by the arrow identified with reference number 7 in FIG. 5. From this point on, the IP telephone call setup would proceed normally.

With the method described above, when an incoming call directed to a called party's mobile device 540 is received by an IP telephony system, it is possible to cause a communications software application resident on a called party's mobile telephony device 540 to activate and register itself with a proxy server. It is also possible to generate signaling that informs the inbound proxy server of the identity of an outbound proxy server with which the called party's mobile device registered. Thus, it is possible to complete an IP telephone call to the called party's mobile telephony device 540, even through the communications software application on the called party's mobile telephony device 540 was not active when the incoming call setup request was received.

As mentioned above, when an IP telephony system receives a request to setup a new IP telephony communication to a communications software application on a user's telephony device, the IP telephony system may not be aware of the situation which exists on the user's telephony device. More specifically, the IP telephony system may not know if the communications software application can be reached directly by a proxy server of the IP telephony system, if the communications software application is in the background of an operating system on the user's telephony device, or if the communications software application is even running on the user's telephony device.

It is important to setup the new requested IP telephony communication as rapidly as possible. If there is any significant delay in setting up the new IP telephony communication, the calling party may conclude that the setup attempt has failed, and the calling party will simply hang up while the IP telephony system is still in the process of setting up the call. For these reasons, it makes sense to simultaneously attempt to contact the communications software application directly via an outbound proxy server, and to request that a push notification be sent to the called party's telephony device. It may take a considerable amount of time for a push notification to be delivered to a called party's telephony device, for the user to accept the push notification, for the communications software application to be loaded and run, and for the communication software application to then contact the IP telephony system for purposes of setting up the new IP telephony communication. Thus, one would want the push notification to be sent as quickly as possible.

Unfortunately, simultaneously sending a direct communication to the communications software application and requesting that a push notification be sent can have undesirable consequences. For example, if the direct communication to the communications software application is successful, the outbound proxy server will setup the new IP telephony communication, and the called party can begin communicating with the calling party. While that process is ongoing, or after the calling and called parties have begun communicating, the push notification will arrive at the called party's telephony device. The called party's telephony device will not be aware that the push notification relates to the same IP telephony communication that is already in progress. As a result, the called party's telephony device will respond to the push notification as if a second IP telephony communication is to be setup. This could interrupt the setup process that has already begun, or it could interrupt the IP telephone call that is already ongoing between the calling and called parties.

Figure 7:
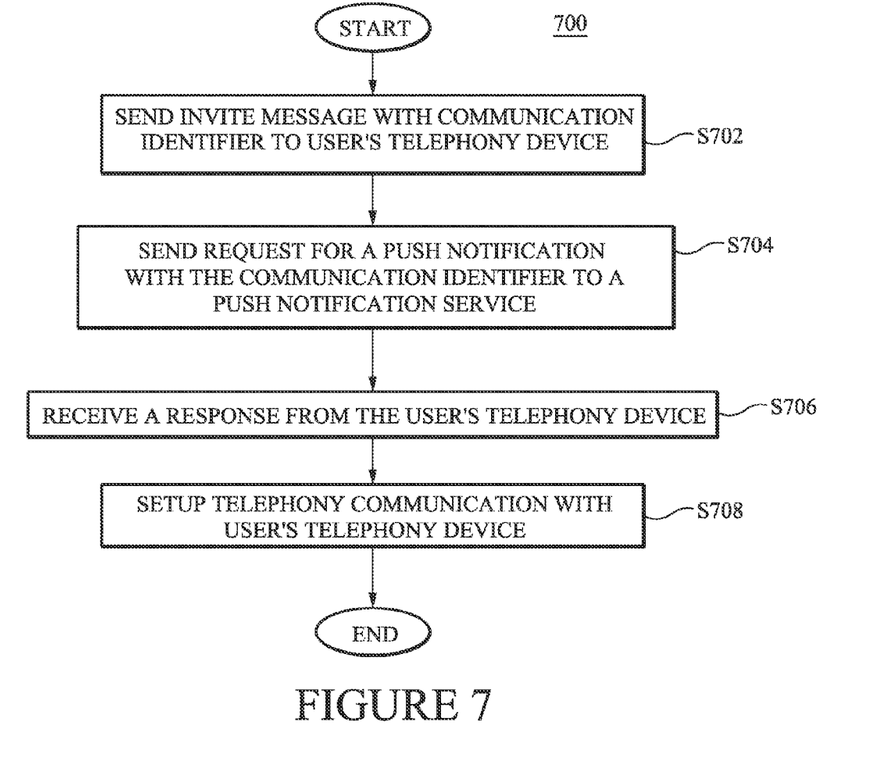
FIG. 7 is a flowchart illustrating steps of a first method performed by elements of an IP telephony system to setup a new telephony communication to a mobile telephony device.
Figure 8:
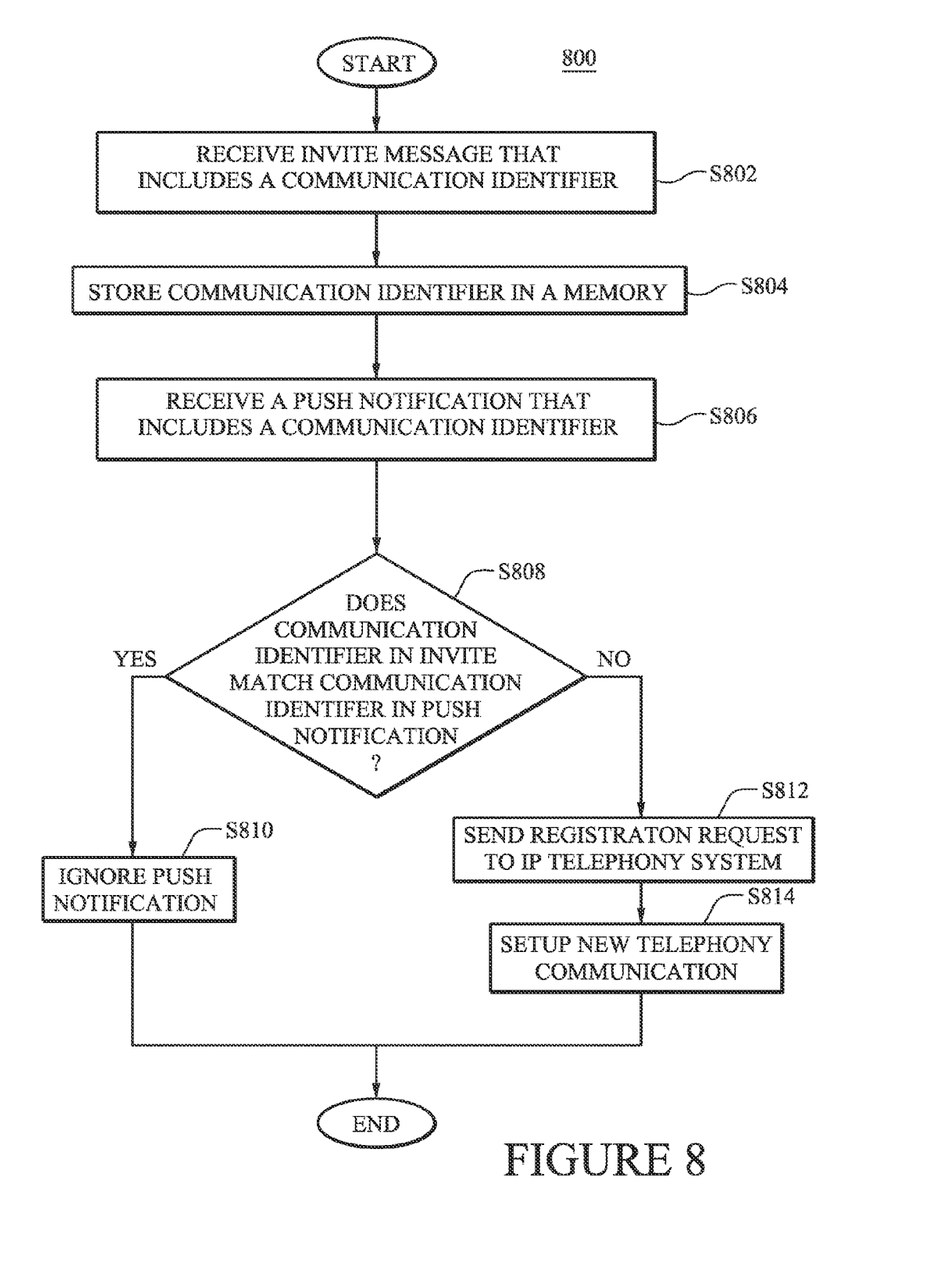
FIG. 8 is a flowchart illustrating steps of a method performed by a communications software application on a mobile telephony device to setup a new telephony communication with elements of an IP telephony system.
Figure 9:
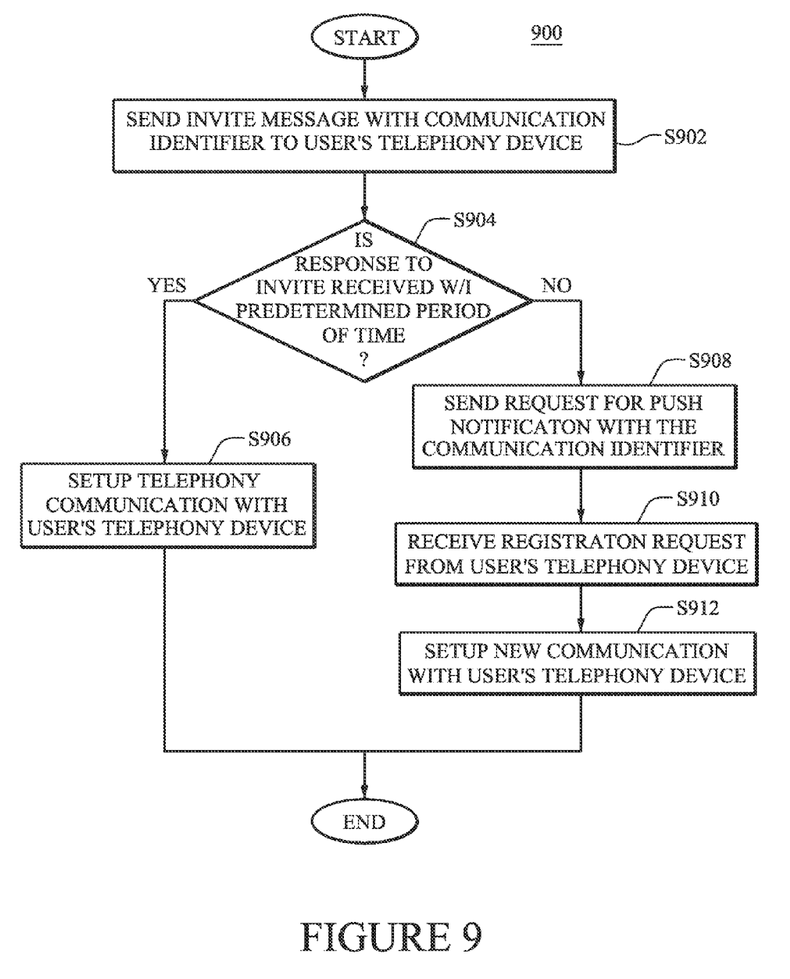
FIG. 9 is a flowchart illustrating steps of a second method performed by elements of an IP telephony system to setup a new telephony communication to a mobile telephony device.

The operating systems of some mobile telephony devices make it possible to ignore a push notification under certain circumstances. Other operating systems are not able to simply ignore a push notification. Because of these differences, it is desirable for an IP telephony system to use different methods of setting up a new IP telephony communication to a communications software application on a user's telephony device. FIG. 7 illustrates steps of a method performed by the IP telephony system when the called party's telephony device is capable of ignoring certain push notifications. FIG. 8 illustrates the corresponding steps of a method that is performed by the called telephony device under these circumstances. FIG. 9 illustrates steps of a method performed by the IP telephony system when the called party's telephony device is not capable of ignoring a push notification.

As illustrated in FIG. 7, when a called party's telephony device is capable of ignoring a push notification, and a calling party has requested that a new IP telephony communication be established with a communications software application on the called party's telephony device, the method 700 begins and proceeds to step S702 where an outbound proxy server of the IP telephony system attempts to send a SIP INVITE message to the called party's telephony device. Immediately thereafter, the IP telephony system also requests that a push notification be sent to the called party's telephony device. Of course, in alternate embodiments, the request for a push notification may be sent first, and the SIP INVITE message could be sent immediately thereafter. Regardless, the idea is to send both the SIP INVITE message and the request for a push notification at substantially the same time. The IP telephony system will not necessarily know that the SIP INVITE message will be successful. And for this reason, one wishes for the push notification to be sent as quickly as possible, as a backup in case the SIP INVITE message fails to reach the communications software application on the called party's telephony device.

When the SIP INVITE message is sent to the called party's telephony device, the SIP INVITE message includes a communication identifier that is unique to this particular IP telephony communication. The request for a push notification indicates that the push notification sent to the called party's telephony device is also to include the same communication identifier.

Turning to FIG. 8, the method 800 performed by the called party's telephony device begins and proceeds to step S802, wherein the SIP INVITE message with the communication identifier is received. This means that the outbound proxy server of the IP telephony system was successful in sending a communication directly to the communication software application on the called party's telephony device. In step S804, the communication software application extracts the communication identifier from the message received from the outbound proxy server, and stores the communication identifier in a memory on the called party's telephony device.

The communication software application on the called party's telephony device can then communicate with the outbound proxy server of the IP telephony system to setup the requested IP telephony communication with the calling party. At some point in time after the SIP INVITE message is received, the called party's telephony device will also receive, in step S806, the push notification that was requested by the IP telephony system. As mentioned above, the push notification will also include the unique communication identifier assigned to this IP telephony communication.

In step S808, the communication software application on the called party's telephony device compares the communication identifier in the received push notification to the communication identifiers stored in the memory. If the communication identifier in the push notification matches a communication identifier in the memory, this means that a previously received SIP INVITE message received in step S802 contained the communication identifier. This, in turn, means that the setup of the new IP telephony communication has already begun, and that the IP telephony communication between the calling and called parties may already be ongoing. For this reason, if the comparison performed in step S808 indicates that the communication identifier in the received push notification matches a communication identifier already stored in the memory, the method proceeds to step S810, and the push notification is ignored. The method then ends.

On the other hand, if the initial SIP INVITE message sent from an outbound proxy server of the IP telephony system was not received by the called party's telephony device, then the communication identifier in the push notification received in step S806 would not match any communication identifiers stored in the memory of the called party's telephony device. When the comparison is performed in step S808, and no match is found, the method proceeds to step S812, and the communication software application on the called party's telephony device registers with the IP telephony system. The method then proceeds to step S814 where the communication software application communicates with the IP telephony system to setup the new IP telephony communication between the calling and called parties. The method then ends.

The communication identifiers may be stored in memory for only a predetermined period of time. In alternate embodiments, the memory used to store the communication identifiers may only hold a predetermined number of communication identifiers. In this type of an embodiment, once the memory is full of communication identifiers, when a new communication identifier is received and stored in memory, the oldest communication identifier stored in the memory is deleted.

In alternate embodiments, the communication sent from the communication software application to the IP telephony system in step S812 may not be a registration request. Instead, the communication could be some other type of communication which simply serves to re-open a pinhole of a network interface device that is providing the called party's telephony device with access to a data network.

In alternate embodiments, the receipt of a push notification may serve to move a communications software application from the background to the foreground, and the message sent in step S812 may be some type of communication sent to a server of the IP telephony system after the communication software application is brought to the foreground. The communication could be a registration request, or some other type of communication.

Returning to FIG. 7, in step S706 an element of the IP telephony system receives a response communication from the called party's telephony device. The type of response that is received could vary. For example, if the SIP INVITE message sent to the called party's telephony device is received by the called party's telephony device, a first type of response message may be received by the IP telephony system. If the SIP INVITE message is not received by the called party's telephony device, then the first response communication received by the IP telephony system could be a registration request message sent by the communication software application on the called party's telephony device in step S812 of the method illustrated in FIG. 8. Of course, as noted above, the message sent from the called party's telephony device to the IP telephony system in step S812 could take some other form.

The method performed by the IP telephony system then proceeds to step S708, where the IP telephony system communicates with the communications software application to setup the new IP telephony communication.

The methods illustrated in FIGS. 7 and 8 are possible because the operating system of the called party's telephony device is capable of ignoring a push notification if the communication identifier in the push notification matches a push notification in an earlier received SIP INVITE message. However, if the operating system of the called party's telephony device is not capable of ignoring a push notification, this method will not work. Under those circumstances, a method as illustrated in FIG. 9 is performed by the IP telephony system.

As illustrated in FIG. 9, when the IP telephony system needs to setup a new IP telephony communication to the communication software application on a called party's telephony device, the method 900 begins and proceeds to step S902, where a proxy server of the IP telephony system attempts to send a SIP INVITE message to the called party's telephony device. If the SIP INVITE message is received by the called party's telephony device, the IP telephony system is likely to receive a response message within a relatively short period of time. In step S904, a check is performed to determine if a response message is received by the IP telephony system within a predetermined period of time. If so, the method proceeds to step S906 and elements of the IP telephony system and the communication software application on the called party's telephony device communicate to setup the new IP telephony communication.

If the check performed in step S904 indicates that no response is received by the IP telephony system within the predetermined period of time, the assumption is that the original SIP INVITE message sent in step S902 did not reach the communication software application on the called party's telephony device. This could occur for a number of reasons. Regardless of the reason, the method proceeds to step S908, where the IP telephony system requests that a push notification be sent to the called party's telephony device.

Assuming that the push notification is successfully received, and that the user wishes to accept the new incoming IP telephony communication, the push notification will result in the communication software application on the called party's telephony device sending a registration request to the IP telephony system, which is received in step S910. Of course, as explained above, in alternate embodiments, the communication sent from the called party's telephony device, and received by the IP telephony system in step S910 may not be a registration request. Instead, this communication could take some other form. However, the method then proceeds to step S912, where elements of the IP telephony system and the communications software application on the called party's telephony device communicate to setup the new IP telephony communication.

If the initial SIP INVITE message sent from the IP telephony system to the called party's telephony device does not reach the communication software application on the called party's telephony device, then a method as illustrated in FIG. 9 may take longer to setup the new IP telephony communication than a method as illustrated in FIGS. 7 and 8. The additional delay results from the fact that in a method as illustrated in FIG. 9, the IP telephony system will wait for a predetermined period of time to see if the SIP INVITE message is successful before requesting that a push notification be sent. However, the method illustrated in FIG. 9 will prevent a push notification from being sent in those situations where the initial SIP INVITE was successful, which can prevent problems from occurring, as noted above.

The foregoing description related to actions that would be performed when an incoming telephone call is to be connected to a user's telephony device. However, the same basic methods could also be used to setup or deliver other types of communications to a user's telephony device. For example the same basic methods could be used to deliver a text or video message to a user's telephony device. These methods might also be used to deliver information to the software application on a user's telephony device, such as a software update or information about a missed call.

In some of the methods described above, a unique identification number is used to identify a particular telephony communication. In alternate embodiments, it may be possible to identify individual telephony communications based on a combination of the time of the communication, and either the calling party's telephone number, or some other identifying information regarding the calling party.

The forgoing description makes reference to certain standard SIP messaging. In alternate embodiments, different types of messaging could be used to establish a VOIP telephone call between a calling party and a called party's mobile device. SIP signaling is merely one way in which it could occur.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of establishing a telephony communication with a server of an IP telephony system, comprising:
   receiving, from a server of an IP telephony system, a request to setup a telephony communication, wherein the request includes a communication identifier;
   receiving, from a third party server, a push notification, wherein the push notification includes a communication identifier; and
   failing to respond to the push notification if the communication identifier in the message received from the server of the IP telephony system matches the communication identifier in the push notification received from the third party server.

2. The method of claim 1, further comprising sending a response message to a server of the IP telephony system if the communication identifier in the request received from the server of the IP telephony system does not match the communication identifier in the push notification received from the third party server.

3. The method of claim 2, wherein the step of sending a response message to a server of the IP telephony system comprises sending a registration request to the server of the IP telephony system.

4. The method of claim 1, further comprising:
   sending a response to the server of the IP telephony system; and
   communicating with the server to setup a telephony communication.

5. The method of claim 1, wherein the step of receiving, from a server of an IP telephony system, a request to setup a telephony communication comprises receiving a Session Initiation Protocol (SIP) INVITE request from the server of the IP telephony system.

6. The method of claim 5, further comprising sending a SIP Acknowledgement message to the server of the IP telephony system.

7. The method of claim 1, further comprising saving, in a memory, the communication identifier in the request received from the server of the IP telephony system.

8. A system for establishing a telephony communication with a server of an IP telephony system, comprising:
   means for receiving, from a server of an IP telephony system, a request to setup a telephony communication, wherein the request includes a communication identifier;
   means for receiving, from a third party server, a push notification, wherein the push notification includes a communication identifier; and
   means for failing to respond to the push notification if the communication identifier in the message received from the server of the IP telephony system matches the communication identifier in the push notification received from the third party server.

9. A system for establishing a telephony communication with a server of an IP telephony system, comprising:
   a signaling unit that receives, from a server of an IP telephony system, a request to setup a telephony communication, wherein the request includes a communication identifier; and
   a push notification receiving unit that receives, from a third party server, a push notification, wherein the push notification includes a communication identifier, wherein the push notification receiving unit is configured to fail to respond to the push notification if the communication identifier in the message received from the server of the IP telephony system matches the communication identifier in the push notification received from the third party server.

10. The system of claim 9, further comprising a registration unit that sends a registration message to a server of the IP telephony system if the communication identifier in the request received from the server of the IP telephony system does not match the communication identifier in the push notification received from the third party server.

11. The system of claim 9, further comprising a registration unit that sends a response to the server of the IP telephony system, and that communicates with the server to setup a telephony communication.

12. The system of claim 9, wherein the signaling unit receives, from the server of the IP telephony system, a Session Initiation Protocol (SIP) INVITE message, and wherein the signaling unit sends a SIP Acknowledgement message to the server of the IP telephony system.

13. The system of claim 9, further comprising a memory, wherein when the signaling unit receives a request to setup a telephony communication, the signaling unit stores the communication identifier contained in the received setup request in the memory.

14. A non-transitory computer readable medium containing instructions which, when performed by one or more processors of a telephony device, cause the telephony device to perform a method of establishing a telephony communication with a server of an IP telephony system, the method comprising:
   receiving, from a server of an IP telephony system, a request to setup a telephony communication, wherein the request includes a communication identifier;
   receiving, from a third party server, a push notification, wherein the push notification includes a communication identifier;
   failing to respond to the push notification if the communication identifier in the message received from the server of the IP telephony system matches the communication identifier in the push notification received from the third party server.

15. The non-transitory computer readable medium of claim 14, wherein the method further comprises sending a response message to a server of the IP telephony system if the communication identifier in the request received from the server of the IP telephony system does not match the communication identifier in the push notification received from the third party server.

16. The non-transitory computer readable medium of claim 15, wherein the step of sending a response message to a server of the IP telephony system comprises sending a registration request to the server of the IP telephony system.

17. The non-transitory computer readable medium of claim 14, wherein the method further comprises:
   sending a response to the server of the IP telephony system; and
   communicating with the server to setup a telephony communication.

18. The non-transitory computer readable medium of claim 14, wherein the step of receiving, from a server of an IP telephony system, a request to setup a telephony communication comprises receiving a Session Initiation Protocol (SIP) INVITE request from the server of the IP telephony system.

19. The non-transitory computer readable medium of claim 18, wherein the method further comprises sending a SIP Acknowledgement message to the server of the IP telephony system.

20. The non-transitory computer readable medium of claim 14, wherein the method further comprises saving, in a memory, the communication identifier in the request received from the server of the IP telephony system.

* * * * *